United States Patent
Liang et al.

(10) Patent No.: US 7,697,687 B2
(45) Date of Patent: *Apr. 13, 2010

(54) STREAMING IMPLEMENTATION OF ALPHAETA PHYSICAL LAYER ENCRYPTION

(75) Inventors: Chuang Liang, Evanston, IL (US); Gregory S. Kanter, Chicago, IL (US); Eric Corndorf, Minneapolis, MN (US); Prem Kumar, Skokie, IL (US)

(73) Assignee: Nucrypt, Inc., Evanston, IL (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/404,329

(22) Filed: Apr. 13, 2006

(65) Prior Publication Data

US 2008/0101607 A1    May 1, 2008

Related U.S. Application Data

(60) Provisional application No. 60/670,934, filed on Apr. 13, 2005.

(51) Int. Cl.
    *H04K 1/00* (2006.01)
(52) U.S. Cl. .................................................. 380/255
(58) Field of Classification Search ................ None
    See application file for complete search history.

(56) References Cited

U.S. PATENT DOCUMENTS

| 5,081,679 A | 1/1992 | Dent |
| 5,805,705 A | 9/1998 | Gray et al. |
| 7,333,611 B1 * | 2/2008 | Yuen et al. .................. 380/256 |

\* cited by examiner

*Primary Examiner*—Brandon S Hoffman
(74) *Attorney, Agent, or Firm*—Nadya Reingand

(57) ABSTRACT

A method of synchronizing the encryption/decryption functions of an AlphaEta physical-layer encryption or key generation system. The method includes the insertion of a header to indicate the start of encryption after clock-synchronization has been established. The method also allows for a side-channel to signal other useful information, such as a loss-of-syncrhonization signal from Bob or to synchronize a dynamic key change.

22 Claims, 4 Drawing Sheets

STREAMING IMPLEMENTATION OF ALPHAETA PHYSICAL LAYER ENCRYPTION

CROSS REFERENCE TO RELATED APPLICATION

This application claims priority benefit from provisional application No. 60/670,934, filed on Apr. 13, 2005, which application is incorporated herein by reference in its entirety.

STATEMENT REGARDING FEDERALLY SPONSORED RESEARCH

The United States Government has certain rights to this invention pursuant to Grant No. F30602-01-2-0528 from Defense Advanced Research Projects Agency (DARPA) to Northwestern University.

BACKGROUND OF THE INVENTION

Field of the Invention

The present invention relates generally to information security, and more particularly to a method and system for achieving cryptographic objectives of data encryption and key expansion. The invention synchronizes the actions of the transmitter and receiver to allow for practical implementations which can transmit streaming data with dynamic keys and automatically resynchronize in the event of a disruption in transmission.

Problems associated with information security have become a major issue in this still emerging openly accessible information society. While cryptography is an indispensable tool in addressing such problems, there are both questions of security and efficiency with the standard cryptographic techniques. It is desirable to have an additional level of protection at the physical-layer which makes it difficult to capture and analyze the signal. Such a technique can derive its security in different ways than standard cryptographic techniques, thus potentially bolstering security much further.

Recently, a method of physical-layer cryptography called AlphaEta has been proposed which has several useful properties including compatibility with typical WDM infrastructure and security bolstered by noise (quantum or otherwise). In order to run such an encryption system in a typical environment, there must be a method of synchronizing the encryption and decryption functions. Other features, such as seamlessly loading new keys from a key distribution network, may also be desired. These functions and features require bit-level synchronization between the transmitter and receiver. It is useful if such synchronization can be accomplished with transceivers capable of sending and receiving continuous streaming data, as is often the case for optical communication systems. Solutions to the synchronization problem have been proposed which are applicable to various issues in communication systems, such as the handoff in a cell-based system.

Laboratory demonstrations of AlphaEta have used a software code in a personal computer to create the running keys, and the extended key generators of Alice and Bob were synchronized by using a common clock on both systems. However, a common clock is not practical for real world communication systems. No practical methods of synchronizing AlphaEta-based systems have been demonstrated by the prior art.

ALphaEta has some unusual properties, for instance, AlphaEta requires that the decryption signal arrive at the decryptor before the encrypted signal is detected, and thus a customized synchronization method is desirable.

It is accordingly the primary objective of the present invention that it provides a method and system for transmitting encrypted data in the AlphaEta format between first and second locations and synchronizing the encryption/decryption functions under conditions including streaming and bursty data as well as with automated key updates from a key-distribution system. Similar methods are also applicable to maintain synchronization in AlphaEta-like key generation systems as well.

It is another objective of the present invention that it provide such functions in a way that is compatible with traditional communications equipment and protocols.

SUMMARY OF THE INVENTION

Previous descriptions and demonstrations of AlphaEta did not address the crucial need for bit-level synchronization between the transmitter (Alice) and receiver (Bob) under conditions typical in communications systems, including streaming data and the lack of an externally provided common clock. The disadvantages and limitations of the background art discussed above are overcome by the present invention.

In AlphaEta, a short secret key is shared between the transmitter (Alice) and the receiver (Bob). This key seeds an extended key generator (EKG), which extends the short secret key into a very long sequence of bits, called the extended key. For every data bit to be transmitted, several of these extended key bits are grouped and used as a running key to choose the optical basis state for encrypting and transmitting the (binary) data. The transmitted signal is thus a multilevel signal. The number of allowable basis states is determined by the length of the grouped running key and, ultimately, the resolution of the digital-to-analog converter (DAC).

The present invention uses a chip-based stream cipher (or multiple stream ciphers) to generate the running key simultaneously with the data. The transmission is initialized with a preamble to allow for clock-recovery circuits in the transmitter and the receiver to generate a common clock between the transmitter (Alice) and the receiver (Bob) and, if needed, allow for the stabilization of a receive side optical demodulator. In this case, the transmitter sends data at a particular rate and the receiver must lock onto the data. The CDR in the transmitter is provided for locking onto the input data as will be described. The running keys are synchronized by using an unencrypted header sent before the encrypted data. In this way the AlphaEta encryption/decryption can initialize. The invention also includes a control channel to allow for advanced features, such as dynamically loading new keys or re-establishing synchronization should the channel get disrupted. These new methods allow for a robust AlphaEta communications system, applicable to typical operating environments.

More specifically, the present invention provides a method and system for transmitting encrypted data from a first location to a second location over a communication channel. In accordance with the invention, a shared, multi-bit secret key K is extended at the transmitting and receiving locations to produce an extended key K'. The extended key K' is grouped and mapped to a function to produce a mapped running key K" that is used at the transmitting location, along with the bits of a binary bit sequence to be transmitted, to select a basis state for each bit to be transmitted to the receiving location. A signal is modulated using the selected basis state for transmission to the receiving location. At the receiving location, using the mapped running key K", the encrypted multilevel signal is subjected to a basis-state rotation and converted back to a two level signal, effectively decrypting the signal. The signal is then demodulated to recover the binary bit sequence, and the binary bit sequence is decoded to recover the binary bit sequence transmitted.

In accordance with the present invention, synchronization between the transmitter and the receiver is achieved by an AlphaEta initialization procedure that includes sending a preamble from the transmitter to the receiver and transmitting a header to indicate when decryption should be initiated at the receiver. The shared multi-bit secret key is extended at the receiver simultaneously with reception of data at the receiver.

To initially synchronize the encryption/decryption process, Alice transmits an unencrypted initialization signal or preamble to allow Bob to recover the clock with a clock-recovery circuit and, if needed, lock his interferometer (in the case of differential-phase shift keyed transmissions). This preamble can be a repetitive signal produced, for example, by a linear feedback shift register with a key-length shorter than the length of the header. It is important that the header pattern is never generated by the preamble signal. Alice inserts a header into the initialization signal being transmitted in order to signal to Bob when to begin the decryption process. Alice begins encryption at an appropriate time to allow for Bob's decryption to properly synchronize with her encryption.

Before encryption/decryption synchronization is established, Bob does not apply a decryption signal to his decryptor. Since Alice is not yet encrypting, this allows Bob to receive a standard on-off keyed signal after demodulation which can be interfaced to standard clock-and-data recovery circuits in order to recover the clock. Bob monitors the initial transmission, comparing the received data with the known header. Upon receipt of the header, which could be determined, for instance, by correlating a string of received data to the known header, Bob starts his extended key generator. There is a fixed delay between Bob starting his extended key generator and the decryption signal appearing at the decryptor. This delay is, by design, an integral number of bits. Alice waits an amount of time equal to this delay between the time she sends the header and the time she starts encryption. In this way, the encryption/decryption signals are synchronized. Since the clock-and-data recovery circuit is still receiving a signal which appears to be on/off keyed (since it is already decrypted), the clock-and-data recovery circuit continues to work as desired. If, on the other hand, an encrypted signal (rather than an un-encrypted header) were being sent to the CDR, there would be no guarantee that this would work properly in providing synchronization between encryption/decryption signals. Note that pulsed return-to-zero coding could be used to allow robust clock recovery of an encrypted signal, but without the specified un-encrypted header it would be difficult to synchronize the encryption/decryption signals. Thus, the inclusion of the unencrypted preamble and header allow common components to be used to easily synchronize the AlphaEta encryption/decryption.

Upon first receiving data from an external source (either a new external source of data with a different local clock than used previously, or after a delay in receiving data from a single external source), Alice recovers the clock so that any synchronization between Alice and Bob is in phase with the incoming streaming data, allowing for a seamless transition from the AlphaEta initialization procedure to transmit actual encrypted data. Alice can buffer the incoming data bits so that they are not lost during the initialization procedure.

Alice and Bob can use additional signaling either in-band or out-of-band for communicating with one another. Such a signaling can be conducted over a separate unencrypted channel separable from the encrypted channel via wavelength, polarization, time, etc. and is referred to herein as a 'side channel' or a 'control channel'. If synchronization is lost, Bob will experience invalid data which can be detected by various means such as an uncorrectable amount of errors from a forward-error correction sub-system, loss of synchronization of the underlying data protocol (for instance synchronous optical network (SONET) information), or an analysis of the received signal via time-domain sampling or frequency-domain techniques. Bob can then use the side channel to signal to Alice to restart the AlphaEta synchronization procedure. Restarting the synchronization procedure means that Alice will send a new unencrypted header. If the common clock is lost during the unsynchronized transmission, then a new preamble must also be sent. For security purposes, the re-synchronization may need to be slightly modified from the initial synchronization. For instance, if a linear-feedback shift register (LFSR) is used as the extended key generator (EKG), a new key will be loaded by Alice and Bob before they resynchronize. Alternatively, if a counter-mode cipher is being used as the EKG, Alice and Bob can continue using the same key, but must choose a new counter value that has not been previously used. Alice and Bob can agree on such a counter value (or a location of a key stored in memory) through communications conducted over the side channel.

Alice and Bob can also use the side channel to synchronize the loading of new keys from a key distribution system. The side channel can be used to generate a specific signal when Alice transitions to the next key in the sequence, allowing Bob to maintain bit-level synchronization during the transition. In some cases, Alice can send the key-load signal before she transitions to the new key, to account for delays in Bob's ability to apply the decryption signal due to, for instance, the physical delay between Bob's electrical decryption signal and his optical decryption phase modulators. In practice, the dynamic key-load signal can be encrypted or unencrypted, as a dynamic loading of a new key can only be done when synchronization is in tact.

DESCRIPTION OF THE DRAWINGS

These and other advantages of the present invention are best understood with reference to the drawings, in which.

DETAILED DESCRIPTION OF THE PREFERRED EMBODIMENT

Coherent-State Data Encryption

The present invention provides a quantum cryptographic protocol using two-mode coherent states that provides enhanced cryptographic security. Via appropriate insertion and detection of an in-band header and/or other information transmitted by a side-channel, the system can robustly synchronize the encryption/decryption functions in realistic environments where precise timing information needs to be extracted. In accordance with the invention, synchronization of the encryption/decryption functions is provided through the use of clock and data recovery circuits in the transmitter and the receiver which together with a preamble transmission, allows for synchronous clocks at Alice and Bob. In order to synchronize the transmitter and receiver running keys, a header is also sent as part of the synchronization process as will shown.

Figures 1A, 1B:
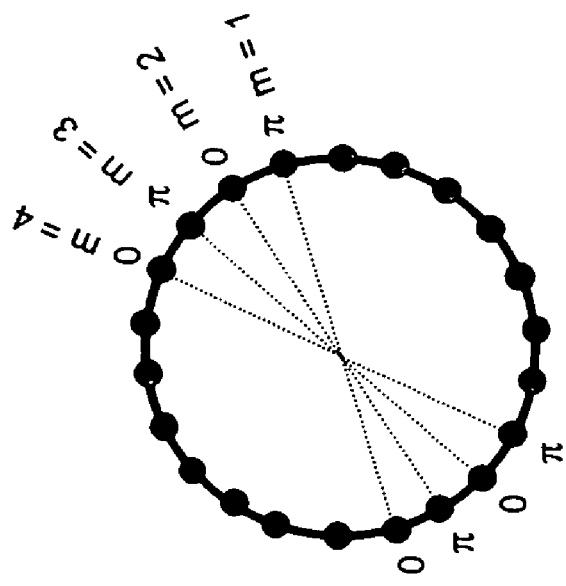
FIG. 1A is an example of the transmission constellation and FIG. 1B is an example of signaling protocol.

Various methods of implementing the AlphaEta protocol exist and have been documented, for example, in U.S. patent applications, Ser. No. 10/674,241, entitled "Ultra-Secure, Ultra-Efficient Cryptographic System", filed on Sep. 29, 2003, and Ser. No. 10/982,196, entitled "Coherent-states based quantum data-encryption through optically-amplified WDM communication Networks", filed on Nov. 5, 2004, which applications are hereby incorporated herein by reference in their entirety. The irreducible measurement uncertainty of two-mode coherent states is one way to generate the noise which is a key element in the security of applicants' scheme. For concreteness, we will assume a two-mode coherent state AlphaEta transmission system which transmits data via differential phase shift keying (DPSK); however it is to be understood that the synchronization methods can be applied to any AlphaEta-like system. The two-mode coherent states employed in this example are depicted in FIGS. 1A AND 1B, where $\theta_m = \pi m/M$, $m \in \{0, 1, 2, \ldots (M-1)\}$, represents a phase bias added to the differentially encoded signal based on the value of an extended key generator, and M is odd. Viewed on the Poincaré sphere, these 2M polarization states form M bases that uniformly span a great circle, also shown in FIG. 1A. For this particular signal constellation, Alice applies an additional $\pi$ phase shift to signal a DPSK bit-to-bit transition (representing a data bit of 'zero') if Alice's running keys representing previous and current basis states have different parity (i.e. even and odd). Alice does not apply the $\pi$ phase shift if she wants to have no DPSK phase transition (data bit of 'one'). If, on the other hand, the running key for previous and current basis states have the same parity (both even or odd), Alice applies the $\pi$ phase shift in order to signal a data bit of 'zero' and no phase shift to signal a data bit of 'one'.

Figure 2:
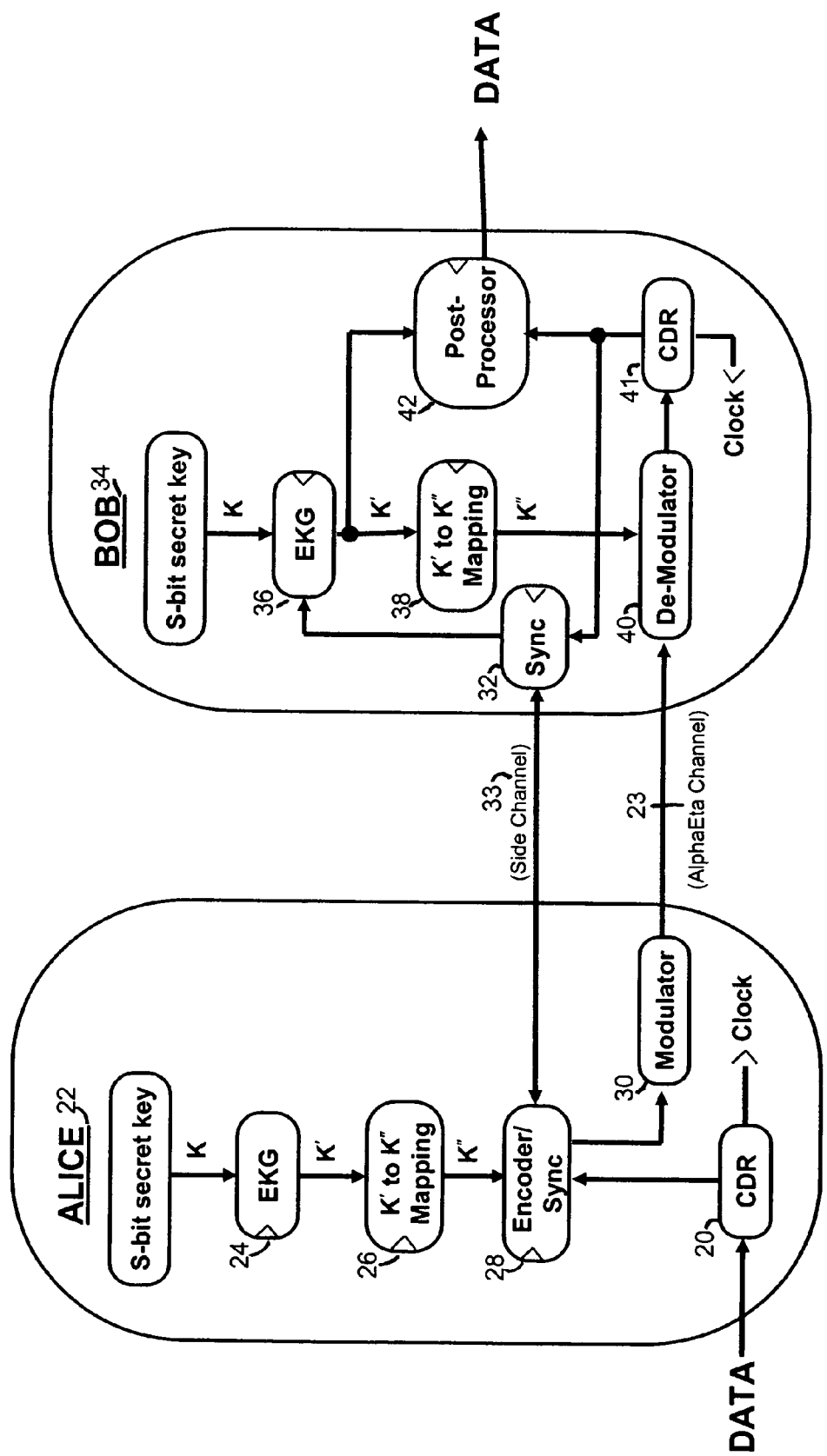
FIG. 2 illustrates the basic flow of the data, running key, and control signals in an AlphaEta data encryption scheme in accordance with the present invention.

FIG. 2 shows the basic flow of the AlphaEta protocol. The AlphaEta system according to the present invention includes a transmitter (Alice) 22 and a receiver (Bob) 34 interconnected by an optical network 23, allowing transmission between the transmitter 22 and the receiver 34. At the transmitter (Alice) 22, the input data is received by a clock-and-data recovery (CDR) circuit 20 which provides a common clock for the components of the transmitter 22. Using a publicly known extended key generator (EKG) 24, the transmitter (Alice) 22 extends an s-bit secret-key, K, to a much longer extended key, K'. Many types of EKGs could be used, for instance those based on linear feedback shift registers (LFSRs) or the advanced encryption standard (AES) in counter mode. The extended key is grouped into disjointed blocks of r-bit running keys, R, where $r=\log_2(M)$ and $s \gg r$. Depending on the data bit and the running-key R, the state is transmitted, where m is the decimal representation of R and the data bits are defined differentially. The grouped output of the EKG is input to an optional mapper 26, which is a substitution box mapping K' to K" (typically a one-to-one mapping, selecting one specific r-bit output K" for each specific r-bit input K'). The output of the mapper 26 is the mapped running key K", which goes to the encoder/sync block 28 along with the data bits that are passed through the CDR 20.

Figure 3:
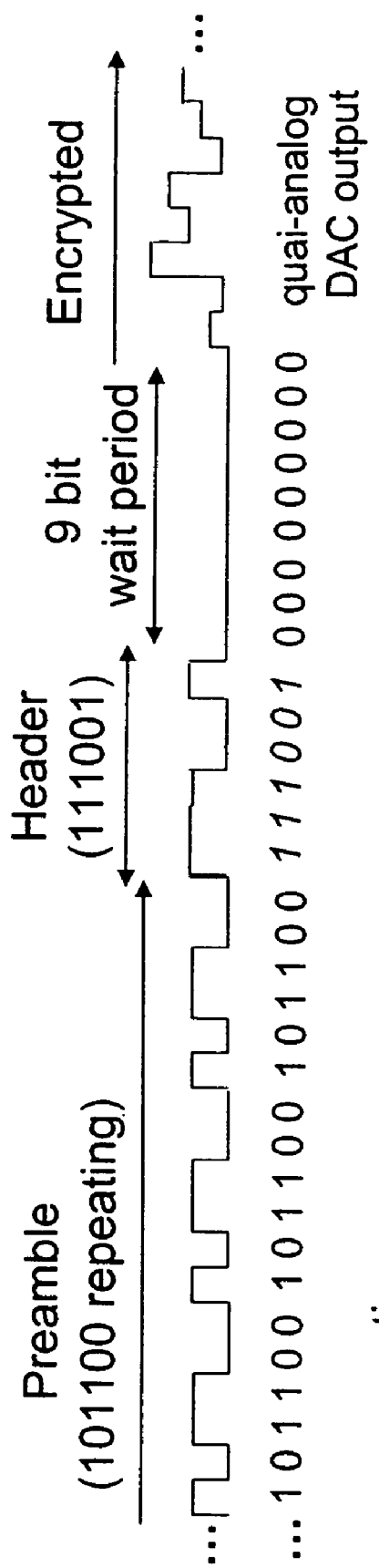
FIG. 3 illustrates the format for data transmitted between the transmitter and the receiver.

The encoder/sync block 28 controls whether the output is the preamble, a header, encoded data, or encrypted data, as appropriate for the desired operation. The preamble is a repetitive data pattern, generated by sending a fixed pattern from memory repetitively or from a short linear feedback shift register. The binary preamble signal needs to be an appropriate pattern such that the receiver clock-and-data recovery circuit 41 can lock onto the clock. The amount of time the preamble is sent is dependent on how long it takes the clock-and-data recovery circuit to generate a reliable clock. The length of the preamble can be determined empirically, where the preamble is sent for a predetermined period of time long enough to allow the CDR to lock, or the length of the preamble can be determined by a communication from Bob to Alice on the side-channel as will be described. The preamble sent must not include the header pattern or a false synchronization will occur. A good candidate for producing the preamble is a short linear feedback shift register (LFSR), configured to produce a fairly long pseudo-random repeating pattern, but which never outputs the header. By way of example, the LFSR can be a five-bit linear shift feedback register making the preamble a repetitive thirty-one bit pattern. The header is a fixed pattern that can not be confused with the preamble. For instance, in FIG. 3 a preamble which is a repeating pattern of '101100' is used with a header of a fixed pattern of '111001'. Alternatively, a series of eight logic 1's is a reasonable header candidate if a 5-bit LFSR is used as the preamble, as no more than five logic 1's will occur in a row during the preamble, thus making the header unique. The header can be stored in a first-in-first-out (FIFO) serial register (memory) which the data enters, thus the header is attached as a prefix to the data. A specified number of bits can be inserted into the data stream and transmitted after the header is transmitted before Alice's EKG 24 is started. This is done to allow Bob time to detect the header, start the receiver EKG 36, and transmit the decryption signal generated by the EKG 36 and mapper 38 to the decryptor of the receiver 34, embodied as demodulator 40, such that Alice's encryption signal and Bob's decryption signal properly align. As shown in FIG. 3, there is a 9-bit pattern of logic 0's transmitted by Alice's modulator 30 before the encrypted data signal is transmitted by Alice. This signifies that there is a 9-bit delay between the time Bob sees the header and the time the decryption signal is actually applied at his decryptor. Note that the encrypted signal is generated by a digital-to-analog converter with many bits of resolution, so that the encrypted output looks analog-like as opposed to the binary transmission prior to encryption. The output of the encoder/sync block 28 goes to the modulator 30, which outputs the optical signal to the optical network for transmission to the receiver 34.

The encoder/sync block 28 also can communicate with the synchronization (Sync) block 32 of the receiver 34 by way of a side channel 33, allowing Bob to signal to Alice if Bob loses synchronization or if Bob wants to request a special operation, such as a key change. Alice also can use the side channel to communicate control information to Bob.

At the receiver (Bob) 34, the CDR 41 allows Bob to establish a common clock during the preamble transmission. Bob does not attempt to decrypt incoming data until the sync block 32 of the receiver 34 determines that the procedure should begin. The sync block 32 determines when to initially start the EKG 36 based on the arrival of the header. The intended receiver (Bob) uses the same s-bit secret-key K, the EKG block 36, and the mapper 38, to apply transformations, via demodulator 40, to the encrypted signals that are received by the receiver 34 according to the running-keys. These transformations (for instance phase rotations) decrypt the received states resulting in either a 1 or 0 binary bit, depending on the logical data bit sent and the corresponding EKG value. The demodulator block 40 may physically contain phase modulators (to decrypt) and a temporally-asymmetric interferometer for differential phase-shift keyed (DPSK) demodulation. This interferometer may need to be phase-stabilized, which is also performed in the demodulator block 40. After the demodulator block 40, the signal enters a CDR 41 and then a post-processor 42, of the receiver 34. The post-processor 42 makes any needed parity changes to the demodulated data, based on the EKG value, to make the demodulated data match the input data.

Alice and Bob thus apply and cancel, respectively, a phase-bias on the signal. This phase-bias on the signal are the encryption/decryption signals determined by the output of the EKG. The phase bias must be stripped off by Bob at the correct time, or in other words, Bob starts the decryption signal at precisely the correct time to cancel Alice's encryption signal. If Bob is even one bit off, the decryption function will not work at all. It is thus necessary to synchronize the process to a fraction of a bit period, which is done by following the encryption/decryption synchronization procedure previously described.

Figure 4:
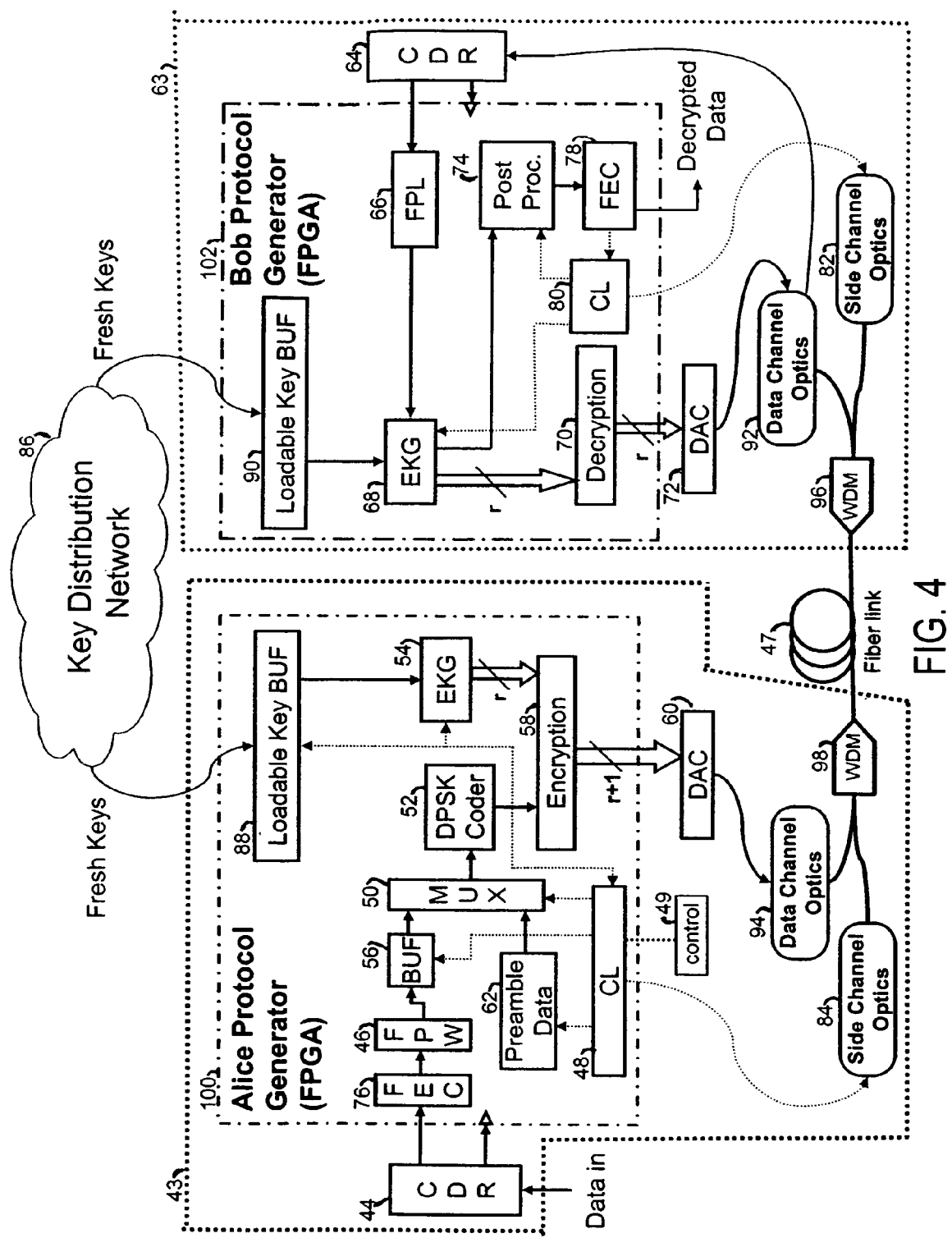
FIG. 4 illustrates an implementation of streaming AlphaEta with a dynamic key-load option in accordance with the present invention.

Reference is now made to FIG. 4 which illustrates a quantum data-encryption transmitter (Alice) 43 and receiver (Bob) 63 in accordance with the present invention. FIG. 4 provides a more detailed implementation of the functions used to establish AlphaEta encryption/synchronization between the transmitter 43 and the receiver 63. The transmitter 43 is coupled to the receiver 63 over an optical fiber connection 47 over which the encrypted data travels. The optical fiber connection includes a data channel over which encrypted data is transmitted and a side channel over which controls are transmitted. Alternatively, the connection could be via free space of any other suitable media. The data channel includes receiver data channel optics 92 and transmitter data channel optics 94, including a phase modulator (not shown) in the transmitter data channel optics 94 and a demodulator (not shown) in the receiver data channel optics 92. Both of the data channel optics 92, 94 also have optical-to-electrical converters, such as photo-diodes. The side channel includes receiver side channel optics 82 and transmitter side channel optics 84. The side channel optics 82 and 84 can include simple directly modulated lasers or externally modulated lasers. In this case, the wavelength of the side-channel optics will be different from that of the main encrypted channel so that traditional wavelength division multiplexers (WDM), 96 and 98, in the receiver 63 and the transmitter 43 can combine and separate the two signals such that they can co-propagate down the fiber link. The data format of the side channel would typically be simple on-off keying to allow for inexpensive and readily available components. The side channel optics also includes a traditional optical-to-electrical conversion device, such as a photodiode, to receive the signal.

Several functions of the transmitter and receiver, including those depicted in the Alice and Bob protocol generators 100 and 102, can be implemented in microelectronic circuits, such as a field programmable gate array (FPGA). FIG. 4 assumes for concreteness the use of an FPGA for many blocks, but similar systems could be made via other means, such as application specific integrated circuits (ASICs). The Alice protocol generator 100 is programmed or designed to assume the functions shown in the diagram, including framing pattern wrapping (FPW) 46, control logic (CL) 48, multiplexing (MUX) 50, differential phase shift key coding (DPSK) 52, extended-key generating (EKG) 54, buffering (BUF) 56, encrypting (ENC) 58, and preamble data generating 62, which functions can be considered as circuits when implemented by an FPGA. For example, in the following description, multiplexing generally will be referred to as multiplexer or block MUX 50, buffering will be referred to as buffer or buffer block BUF 56, etc.

Similarly, the receiver 63 includes a clock and data recovery (CDR) circuit 64 and a protocol generator 102 implemented in a FPGA. The FPGA implementation of the protocol generator 102 is programmed to assume the functions shown in the diagram, including framing-pattern locating (FPL) 66, extended-key generating (EKG) 68, decrypting (DEC) 70, post processing (74), and control logic (CL) 80, which functions can be considered as circuits when implemented by the FPGA.

It is pointed out that the particular electronics illustrated in FIG. 4 are a representative and non-limiting example of one streaming implementation. By way of example, the field programmable gate arrays FPGA can be the type XC2V1000 commercially available from Xilinx Virtex2. The extended-key generating circuits EKG 54 and 68 can each be fifteen 63-bit linear-feedback shift registers (LFSR). The digital-to-analog converters can be 16-bit digital-to-analog converters, such as the model Max 5888, commercially available from Maxim.

At the transmitter 43, the input data running at 155 Mbps (plaintext) are conditioned by the CDR circuit 44 and fed into the Protocol generator 100. The data passes through the framing pattern wrapper circuit (FPW) 46, which inserts the unencrypted header that is used to synchronize the running keys between Alice and Bob. A preamble is sent initially to allow for Bob's CDR 64 to recover the clock. Upon operating a control 49 interfaced to the control logic 48, the multiplexer 50 switches the input to the DPSK coder 52 to the header with the data appended. Other implementations could send the preamble a fixed period of time before switching to the header/data line, or wait for a signal via the side-channel from Bob signifying he has successfully recovered the clock. Fifteen 63-bit linear-feedback shift registers (LFSR) are used as the extended-key generator (EKG) 54, although other more complex streaming ciphers could also be used. Moreover, although the disclosed embodiment uses fifteen 63-bit linear-feedback shift registers (LFSR), the size and number of linear-feedback shift registers can be different depending upon application and the size desired for the extended key. Additionally, other algorithms for the EKG exist, such as the Advanced Encryption Standard (AES), and could be used as well.

The DPSK-coded data is then encrypted by the encryption block 58 where fifteen bits from the running key K" are used to choose the phase basis for each data bit. The least significant bit of each 15-bit bus is XNOR-ed with the data on the corresponding data line to generate a sixteenth bit for that bus. This operation ensures that even and odd phase bases states are interleaved on the $2\pi$ phase circle. The 16-bit bus then enters the DAC 60 the output of which is amplified to drive the phase modulator (not shown) of the data channel optics 94.

Bob's protocol generator 102 contains an EKG 68 and a decryption block 70, which are exactly the same as EKG 54 and encryption block 58 in the transmitter 43. Bob's clock and data recovery circuit CDR 64 recovers the data and clock. The framing-pattern locator FPL 66 signals the circuits of the LFSRs to begin generating the running key K" once the un-encrypted header is located. The output of the DAC 72 is amplified by an inverting amplifier (not shown), which drives a phase modulator (not shown) which form a portion of the demodulator of the receiver data channel optics 92, to reverse Alice's basis encoding. A deterministic post-processing algorithm is used on the recovered data to determine the correct data parity, since the parity of Alice's even and odd bases states are interleaved. Note that the AlphaEta system shown in FIG. 3 also can run in a conventional DPSK mode by disabling the encryption/decryption function and the post processor 74.

As illustrated in FIG. 4, the transmitter 43 and the receiver 63 have loadable key buffers 88 and 90, respectively, for receiving fresh keys transmitted over a key distribution network 86. Fresh keys can be loaded into the key buffers 88 and 90 by the key distribution network 86. The fresh keys are produced by a key distribution system which is separate from, but interfaced to, the AlphaEta encryption system.

In addition, the transmitter 43 and the receiver 63 can provide forward error correction coding. To this end, the transmitter 43 includes a transmit side forward error correction coding circuit (FEC) block 76 and the receiver 63 includes a receive side forward error correction coding circuit (FEC) block 78. The forward error correction coding circuits FEC 76 and 78, which are implemented by an FPGA encode the data such that the data can self-correct some amount of errors.

With continued reference to FIG. 4, in operation, Alice recovers a clock from the incoming data using the clock and data recovery circuit (CDR) 44 and uses this in-phase clock to begin a synchronization procedure. The procedure is controlled the control logic (CL) block 48, which determines what signal should be chosen by the multiplexer (MUX) 50 to be sent to the differential phase shift key (DPSK) coder 52. The control logic block 48 also determines when to start the extended key generator (EKG) 54. The control logic is designed or programmed to send the preamble for a sufficient period of time to allow for Bob's CDR 64 to recover the clock. This could be done, for instance, by sending the preamble for a fixed period of time longer than the clock-capture time of the CDR 64. After Bob has recovered the clock, Alice can switch the input to the DPSK coder 52 from the preamble signal to the header with the streaming data appended.

To initially synchronize the encryption/decryption process, Alice transmits an unencrypted initialization signal or preamble to allow Bob to recover the clock with a clock-recovery circuit 64 and, if needed, lock his interferometer (in the case of differential-phase shift keyed transmissions). This preamble can be a repetitive signal produced, for example, by a linear feedback shift register with a key-length shorter than the length of the header. It is important that the header pattern is never generated by the preamble signal. Alice inserts the header into the initialization signal being transmitted in order to signal to Bob when to begin the decryption process. Alice begins encryption (starts her EKG 54) at an appropriate time to allow for Bob's decryption to properly synchronize with her encryption.

The synchronization procedure includes the transmission of the preamble sequence generated by the preamble data block 62 to allow Bob's clock-recovery circuitry 64 to also recover the clock, the insertion into the signal to be transmitted of the header by the framing pattern wrapper 46 (FPW) following the preamble sequence in order to indicate to Bob the time that Alice started encryption, and the establishing of the appropriate delay period after the header is inserted, to define a delay before the receiver EKG 54 is started, to account for physical delays between Bob starting his EKG 68 upon receiving the header and the actual appearance of the decryption signal at Bob's demodulator (in data channel optics 92). In FIG. 3, this delay period is the duration of nine bits, although the actual delay is design dependent. Alice may choose to buffer the incoming data during the synchronization process using buffer block (BUF) 56 if Alice does not want the data to be dropped during the synchronization protocol. The output from the EKG 54 and the coded data from the DPSK 52 are combined in the encryption block 58 to create a digital r+1 bit signal consistent with the AlphaEta signal constellation. The encryption block 58 contains the mapper 26 (FIG. 2), if used. The output of the encryption block 58 goes to the digital-to-analog converter DAC 60 to generate the analog signal to be sent to the phase modulator located in the data channel optics 94. CL 48 initially lets the preamble pass through MUX 50. After Bob's clock is locked (either determined by sending the preamble for a fixed time that is 'long enough' for the CDRs used or after receiving word from Bob that his clock is locked) the CL 48 shifts the MUX to output the data with the header prepended (prefixed) to the data. The CL 48 also signals to EKG 54 when the EKG should start outputting the running key (beginning encryption). Instead of starting the running key right after the header is sent, the CL 48 causes the EKG 54 to start a few bits later (say 9 bits—a delay programmed into CL 48) since there is a time delay between when Bob sees the header to when his decryption signal arrives at his optical decryption equipment-located in his data channel optics 92. Alice doesn't want to start sending real data until the encryption process starts, so she some additional bits, which could be stored in the FIFO buffer that the header is stored in.

At the receiver 63, Bob uses the clock-recovery circuit 64, the header-locator or framing pattern locator (FPL) 66, and the EKG 68, which is identical to the EKG 54 of the transmitter 43, in order to synchronize the EKG 68 with Alice's EKG 54. The receiver decryption block 70 performs any needed transformation on the output of the EKG 68, such as the mapping function, and then sends the output of the decryption block 70 to the DAC 72 for sending to the demodulator (not shown) located in transmitter data channel optics 92. The postprocessor 74 performs any needed parity flips on the demodulated data according to the value of the EKG 68 in order to generate the correct data parity.

Before encryption/decryption synchronization is established, Bob does not apply a decryption signal to his decryptor 70. Since Alice is not yet encrypting, this allows Bob to receive a standard on-off keyed signal after demodulation which can be interfaced to standard clock-and-data recovery circuits 64 in order to recover the clock. Bob monitors the initial transmission, comparing the received data with the known header. Upon receipt of the header, which is determined by correlating a string of received data to the known header, Bob starts his extended key generator. Alice waits an amount of time equal to the 9-bit delay before she starts encryption. In this way, the encryption/decryption signals are synchronized. Since the clock-and-data recovery circuit 64 is still receiving a signal which appears to be on/off keyed (since it is already decrypted), the clock-and-data recovery circuit 64 continues to work as desired. Pulsed return-to-zero coding could be used to allow robust clock recovery of an encrypted signal, but without the specified un-encrypted header, it would be difficult to synchronize the encryption/decryption signals. The keys are extended at the transmitter substantially at the same time as the data to be transmitted arrives at the transmitter. The keys are extended at the receiver substantially at the same time as the data arrives at the receiver. The header that makes this possible, allowing Bob to start EKG 68 at the right time. Thus, the inclusion of the unencrypted preamble and header allow common components to be used to easily synchronize the AlphaEta encryption/decryption.

Upon first receiving data from an external source (either a new external source of data with a different local clock than used previously, or after a delay in receiving data from a single external source), Alice recovers the clock so that any synchronization between Alice and Bob is in phase with the incoming streaming data, allowing for a seamless transition from the AlphaEta initialization procedure to transmit actual encrypted data. Alice can buffer the incoming data bits so that they are not lost during the initialization procedure.

Also shown in FIG. 4, the transmitter 43 and the receiver 63 provide forward error correction coding through the transmit side forward error correction coding (FEC) block 76 and the receive side forward error correction coding (FEC) block 78. These optional blocks encode the data such that the data can self-correct some amount of errors. Because the receive side FEC block 78 can determine when there are excessive errors, the receive side block 78 can signal the receive side control logic (CL) 80 to stop the EKG 68 (decryption) and send through Bob's side channel optics 82 and Alice's side channel optics 84 to Alice's control logic 48, a signal indicating that synchronization has been lost and that a resynchronization procedure should be started. Depending upon the type of EGK used, other information necessary, such as a counter value can be shared via the side channel optics 82 and 84.

The signal outputs of the side channel optics 82 and 84 are combined with the encrypted channel using standard wavelength division multiplexers (WDMs), such as WDM 96 at the transmitter 43 and WDM 98 at the receiver 63.

Additionally, the control logic CL blocks 48 and 80 can also determine when to load a new or fresh key when a fresh key is provided by the external key distribution network 86, FIG. 4, which loads a key buffer 88 of the transmitter 43 (Alice) and key buffer 90 of the receiver 63. In this example, it is assumed that a fresh key is loaded into the key buffers 88 and 90 by the key distribution network 86 only when there is a fresh key available at both locations. Note that the key buffer could have the ability to store multiple keys. Which key is loaded into the EKG can be agreed upon via the side channel, for instance by specifying the memory location index of the desired key. The frequency with which new keys are loaded is dependent upon the needs of the users and the specifications of the external key distribution system. The AlphaEta encryption system must then be flexible to accept new keys at various rates. In the case of FIG. 4, Alice determines when to load a new key by sensing when a new key is loaded into the key buffer 88. A time delay may be inevitable between the time that Alice and Bob actually receive the fresh keys. Thus, when Alice receives a fresh key, Alice waits a designated time (longer than the expected maximum delay between Alice and Bob receiving fresh keys) before loading the fresh key from the key buffer 88 to the EKG in order to make sure that Bob also has received the fresh key. Alternatively, Alice can wait to receive a verification from via the side-channel, that Bob has loaded the fresh key into his key buffer 90. Then, Alice signals Bob via the side channel optics 84 and 82 that Alice has started using a new key. Bob receives this signal at control logic 80, and proceeds to load the fresh key into EKG 68. Note that Alice can send the signal to load a fresh key before actually loading the fresh key into the buffer 88 in order to allow Bob to account for physical delays between loading of the fresh key into the buffer 90 and the decryption signal appearing at the demodulator, located in the receiver data channel optics 92. FIG. 4 depicts the processing being performed in a field-programmable gate array (FPGA), but alternatively, the processing can be done in other processing electronics.

Alice and Bob can use additional signaling either in-band or out-of-band for communicating with one another. Such a signaling can be conducted over the side (or control) channel 33 (FIG. 2) which is separate from the encrypted AlphaEta channel 23 via wavelength, polarization, time, etc. If synchronization is lost, Bob will experience invalid data which can be detected by various means such as an uncorrectable amount of errors from the forward-error correction sub-system 76, 78, loss of synchronization of the underlying data protocol (for instance synchronous optical network (SONET) information), or an analysis of the received signal via time-domain sampling or frequency-domain techniques. Bob can then use the side channel to signal to Alice to restart the AlphaEta synchronization procedure. For security purposes, the re-synchronization may need to be slightly modified from the initial synchronization. For instance, if a linear-feedback shift register (LFSR) is used as the extended key generators (EKG) 54, 68, a new key will be loaded by Alice and Bob before they resynchronize. Alternatively, if a counter-mode cipher is being used as the extended key generators EKG 54, 68, Alice and Bob can continue using the same key, but must choose a new counter value that has not been previously used. Alice and Bob can agree on such a counter value (or a location of a key stored in memory) through communications conducted over the side channel.

Alice and Bob can also use the side channel to synchronize the loading of new keys from a key distribution system. The side channel can be used to generate a specific signal when Alice transitions to the next key in the sequence, allowing Bob to maintain bit-level synchronization during the transition. In some cases, Alice can send the key-load signal before she transitions to the new key, to account for delays in Bob's ability to apply the decryption signal due to, for instance, the physical delay between Bob's electrical decryption signal and his optical decryption phase modulators. In practice, the dynamic key-load signal can be encrypted or unencrypted, as a dynamic loading of a new key can only be done when synchronization is in tact.

It may therefore be appreciated from the above detailed description of the preferred embodiment of the present invention that it provides a method and system for transmitting encrypted data in the AlphaEta format between first and second locations and synchronizing the encryption/decryption functions under conditions including streaming and bursty data as well as with automated key updates from a key-distribution system. Synchronization of the encryption/decryption functions is provided through the use of clock and data recovery circuits (along with a preamble transmission) in the transmitter and the receiver in order to synchronize the clocks. The running keys at the transmitter and receiver are synchronized by the inclusion of a header as part of the synchronization process. A typical CDR may not normally work with AlphaEta encrypted signal since the CDR expects binary data. However, applicants' system transmits unencrypted messages first, allowing the CDR to initially lock, and since the CDR is placed after the decryptor, it stays locked after encryption/decription starts so that a typical CDR can be used.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for providing bit-level synchronization and secure resynchronization between a transmitter and a receiver capable of transmitting encrypted data between transmitting and receiving locations, comprising:

transmitting a control data from the transmitter to the receiver;

transmitting an initiation signal from the transmitter to the receiver during an initialization procedure;

enabling a key generator of the transmitter to generate a first running key for use in quantum encryption, the encryption applying an encryption protocol which uses quantum noise to make neighboring M-ary transmission states indistinguishable to an eavesdropper;

using the first running key to encrypt the data at the transmitter and transmitting the quantum encrypted data to the receiver over a communication link;

the quantum encrypted data implements a physical layer encryption protocol that uses a multilevel signal scheme, wherein the multilevel signal is determined by the binary data and a running key;

applying a transmitted data, including the initiation signal to a clock recovery circuit of the receiver to produce a local clock for the receiver;

enabling a key generator of the receiver to generate a second running key at the receiver, the second running key being the same as the first running key;

using the second running key to decrypt the encrypted data at the receiver;

using the initialization signal to synchronize a start of quantum encryption with a start of decryption; and transmitting a synchronization signal from the receiver to the transmitter over a control channel to start the resynchronization procedure when synchronization is lost.

2. The method according to claim 1, wherein the initialization signal includes a header and a preamble, and wherein the initialization signal is transmitted unencrypted.

3. The method according to claim 1, wherein transmitting an initialization signal includes providing a delay from a start of the transmission of the initialization signal before enabling the key generators at the transmitter and the receiver.

4. The method according to claim 1, wherein the data to be transmitted is streaming data.

5. The method according to claim 1, wherein the first and second running keys are generated substantially simultaneously with a reception of data at either the transmitter or receiver.

6. The method according to claim 1, wherein a shared, multi-bit secret key is extended at the transmitting and receiving locations to produce the first and second running keys, and wherein the shared multi-bit secret key is extended at the receiver substantially simultaneously with reception of the data at the receiver.

7. The method according to claim 1, wherein the clock recovery circuit at the receiver always sees a binary signal.

8. The method according to claim 1, further comprising using an error estimate from a forward-error correction block to determine when synchronization between the transmitter and the receiver is lost, and transmitting over the control channel an indication of loss of synchronization between the transmitter and the receiver.

9. The method according to claim 1, wherein the transmitter and the receiver employ an AlphaEta quantum encryption and decryption protocol.

10. The method according to claim 1, further comprising temporarily storing at least a portion of the data to be transmitted in a buffer storage during the initialization procedure so as to not drop incoming data bits.

11. The method according to claim 1, wherein the transmitter and the receiver include a loadable key buffer, and further including the steps of
transmitting a fresh key to the transmitter and to the receiver over a key distribution network, and loading the fresh key into the key buffers of the transmitter and the receiver, for subsequent use in generating an extended key.

12. The method according to claim 11, wherein the encrypted channel remains encrypted continuously, and wherein a timing information on the key change is sent in encrypted form.

13. The method according to claim 1, wherein a control channel is used to verify that both the transmitter and receiver have identical new keys ready, and wherein once both parties have these keys the transmitter can dynamically load the key into its extended key generator, and wherein the receiver loads the identical key into its extended key generator at a time determined by the timing information sent from the transmitter contained in the control channel thereby allowing for a seamless key transition.

14. The method according to claim 13, wherein the control channel is at a different wavelength than the encrypted channel.

15. The method according to claim 1, wherein the extended key generator is based on a cipher in counter mode, and upon a disruption in synchronization a new counter is agreed upon using the control channel before resynchronizing.

16. A system for transmitting data between first and second locations with bit-level synchronization and secure resynchronization, said system comprising:
a transmitter at the first location, said transmitter including:
a key generator for extending a shared, multi-bit secret key to produce a first extended key for encrypting data to be transmitted to a receiver; and
an initialization signal generator for producing an initialization signal, wherein the encrypted data is transmitted in a multilevel format based on a binary data to be transmitted and a value of the first extended key;
the transmitter is adapted to also transmit and receive control data to and from the receiver for the transmitter and receiver synchronization, and the receiver at said second location, said receiver including a key generator for extending a shared, multi-bit secret key at a receiving location to produce a second extended key for decrypting encrypted data transmitted by the transmitter, wherein the first and second extended keys are generated substantially simultaneously with the reception of data at the receiver, wherein said transmitter transmits the initialization signal to synchronize a start of encryption with a start of decryption, and wherein
the receiver is adapted to transmit and receive control data to and from the transmitter.

17. The system according to claim 16, further comprising using an error estimate from a forward-error correction block to determine when synchronization between the transmitter and the receiver is lost, and transmitting over the control channel an indication of loss of synchronization between the transmitter and the receiver.

18. The system according to claim 16, wherein transmitter and the receiver employ an AlphaEta encryption and decryption protocol.

19. The system according to claim 16, further comprising temporarily storing at least a portion of the data to be transmitted in a buffer storage during the initialization procedure.

20. The system according to claim 16, wherein the transmitter and the receiver include a loadable key buffer, and wherein said method further comprising transmitting a fresh key to the transmitter and to the receiver over a key distribution network, and loading the fresh key into key buffers of the transmitter and the receiver, for subsequent use in generating an extended key.

21. The system according to claim 16, further comprising using a control channel to synchronize the loading of the fresh key from the key distribution network into the key buffers.

22. The system according to claim 21, where the control channel is at a different wavelength than the encrypted channel.

* * * * *